(12) United States Patent
Nakata

(10) Patent No.: US 8,797,419 B2
(45) Date of Patent: Aug. 5, 2014

(54) IMAGE PROCESSING APPARATUS AND IMAGE PROCESSING METHOD

(75) Inventor: Takamichi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/278,852

(22) Filed: Oct. 21, 2011

(65) Prior Publication Data

US 2012/0105627 A1    May 3, 2012

(30) Foreign Application Priority Data

Oct. 28, 2010    (JP) ................. 2010-242373

(51) Int. Cl.
*H04N 7/18*    (2006.01)
*H04N 5/235*   (2006.01)

(52) U.S. Cl.
CPC ............. *H04N 5/235* (2013.01); *H04N 5/2355* (2013.01)
USPC ...................................... 348/222.1

(58) Field of Classification Search
CPC ...................................... H04N 5/235
USPC .......... 365/127; 348/136, 135, 238, 241, 258, 348/139; 382/274, 271, 270, 261, 264
See application file for complete search history.

(56) References Cited

U.S. PATENT DOCUMENTS

| | | | | |
|---|---|---|---|---|
| 5,517,333 A | * | 5/1996 | Tamura et al. | 358/518 |
| 6,700,685 B1 | * | 3/2004 | Matama | 358/487 |
| 2008/0211923 A1 | * | 9/2008 | Watanabe | 348/222.1 |

FOREIGN PATENT DOCUMENTS

JP        2006-065676        3/2006

* cited by examiner

*Primary Examiner* — Jorge L Ortiz Criado
*Assistant Examiner* — Paul Myers, III
(74) *Attorney, Agent, or Firm* — Cowan, Liebowitz & Latman, P.C.

(57) ABSTRACT

An image processing apparatus has: a first image processing unit for generating first image data by executing a dodging processing to an image signal obtained by picking up an image of an object; and a second image processing unit for generating second image data by executing a dodging processing having a stronger effect thereof than that of the dodging processing by the first image processing unit to the image signal, wherein the first image processing unit repeats the dodging processing a plurality of times.

14 Claims, 9 Drawing Sheets

IMAGE PROCESSING APPARATUS AND IMAGE PROCESSING METHOD

BACKGROUND OF THE INVENTION

1. Field of the Invention

The present invention relates to an image processing apparatus and, more particularly, to an image processing apparatus which can execute a dodging processing.

2. Description of the Related Art

An attention is paid to what is called a wide dynamic range camera, that is, a camera having a wide dynamic range which allows to clearly photograph both an extremely bright object and a dark object in the case where the both objects exist in a same angle of view. As a method of enabling such a photographing of the wide dynamic range, there is a dodging processing which is executed in a darkroom on a silver-halide film picture. For this purpose, there is such a technique (digital dodging processing) that the dodging processing is realized by a digital image processing and an object having a contrast, particularly, an object photographed against the light is corrected. The technique in the related art regarding such a digital dodging processing is disclosed in the Official Gazette of Japanese Patent Application Laid-Open No. 2006-65676. The technique disclosed in the Official Gazette of Japanese Patent Application Laid-Open No. 2006-65676 generates an area judgement image for determining a coefficient for correction, by reducing an image by extracting therefrom a luminance component, subsequently subjecting the reduced image to low-pass filtering, and then enlarging the filtered image.

However, the technique in the related art disclosed in the Official Gazette of Japanese Patent Application Laid-Open No. 2006-65676 aims at only one image processing. Therefore, in an apparatus which should aim at two image processings, for example, in a monitoring camera or the like for simultaneously distributing a moving image and a still image, there is a possibility that degrees of two image quality differ.

In consideration of the above problem, an aspect of the invention is to reduce a difference between the effects of the dodging processings executed in two or more different processing units.

SUMMARY OF THE INVENTION

According to an aspect of the invention, an image processing apparatus of the present invention comprises; a first image processing unit configured to generate first image data by executing a dodging processing to an obtained image signal, and a second image processing unit configured to generate second image data by executing a dodging processing having a stronger effect thereof than the dodging processing by the first image processing unit to the obtained image signal, wherein the first image processing unit is arranged to repeat the dodging processing a plurality of times.

Further features of the present invention will become apparent from the following description of exemplary embodiments with reference to the attached drawings.

DESCRIPTION OF THE EMBODIMENTS

Exemplary embodiments of the present invention will be described in detail with reference to the accompanied drawings.

First Embodiment

The first embodiment of the invention will be described hereinbelow with reference to FIG. 1.

Figure 1:
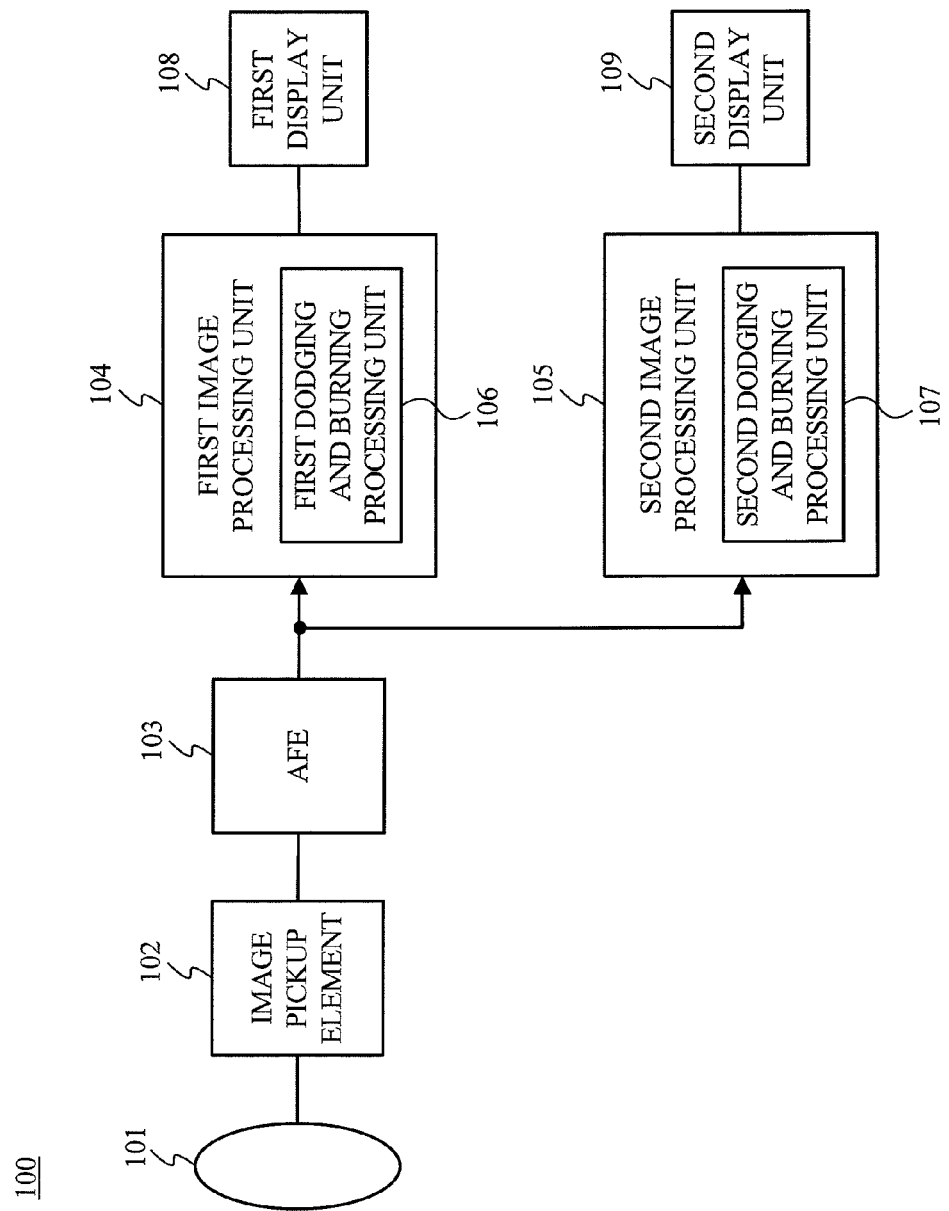
FIG. 1 is a block diagram illustrating an example of a construction of an image pickup apparatus according to the first embodiment.

FIG. 1 is a block diagram illustrating an example of a construction of an image pickup apparatus 100 according to the embodiment.

In FIG. 1, an object image passes through a lens 101 constructed by a plurality of lenses, is generated on an image pickup element 102 such as CCD, CMOS, or the like, and is converted into an electric signal. The electric signal output from the image pickup element 102 is subjected to various kinds of signal processings by an analog front end (AFE) 103 constructed by a correlated double sampling processing (CDS), an analog gain control (AGC), an analog/digital converter (ADC), and the like. The processed electronic signal is output as digital image data (image signal).

The image data output from the AFE 103 is input to a first image processing unit 104 and a second image processing unit 105. Each of the first image processing unit 104 and the second image processing unit 105 is constructed by a digital signal processor (DSP) or the like. The first image processing unit 104 executes a predetermined image processing suitable for a moving image. The second image processing unit 105 executes a predetermined image processing suitable for a still image. The embodiment will be described with respect to an example in which a still image is photographed during the photographing of a moving image, moving image data is input to the first image processing unit 104, and still image data is input to the second image processing unit 105. The still image may be either image data photographed after the photographing of the moving image is temporarily stopped and a driving method of the image pickup element 102 is changed or image data obtained by extracting one of frames obtained by a series of moving image photographing operations.

The first image processing unit 104 has a first dodging processing unit 106 for correcting an object having a contrast, particularly, an object photographed against the light. The second image processing unit 105 similarly has a second dodging processing unit 107.

The first image processing unit 104 and the second image processing unit 105 are different IC (Integrated Circuit)

devices and all of effects obtained by the image processings are not always identical. Particularly, effects obtained by the processings in the dodging processing units are different. The first dodging processing unit 106 executes the dodging processing having a relatively-weak effect thereof. The second dodging processing unit 107 executes the dodging processing having a relatively-strong effect thereof. A fundamental processing method, for example, a method of generating an area judgement image for determining a coefficient for correction, by reducing an image by extracting therefrom a luminance component, subsequently subjecting the reduced image to low-pass filtering, and then enlarging the filtered image, a method of applying a gain to the image data of low luminance and providing a dodging effect, or the like is common in both of the dodging processing units. The effect of each of the dodging processing units may be fixed or the maximum effects thereof are merely different and the effect may be changed within a range up to the maximum effect.

The image data output from the first image processing unit 104 and the second image processing unit 105 are output respectively to a first display unit 108 and a second display unit 109 each of which is constructed by a CRT or a liquid crystal display. Although the apparatus has a construction having two display units of the first display unit 108 and the second display unit 109, one display unit may be used. Although each of the following embodiments will be described on the assumption that a network conformable with a generally-used protocol is used as a communication unit between those display units and the image pickup apparatus, it is not limited to such a network but may be a private line and wired or wireless communication is not limited. One or both of the first display unit 108 and the second display unit 109 may be integrated with the image pickup apparatus. The first display unit 108 and the second display unit 109 may be identical. One display screen may be divided into a plurality of areas and the image data output from the first image processing unit 104 and the second image processing unit 105 may be displayed there.

A processing procedure will be described hereinbelow with reference to FIG. 2.

Figure 2:
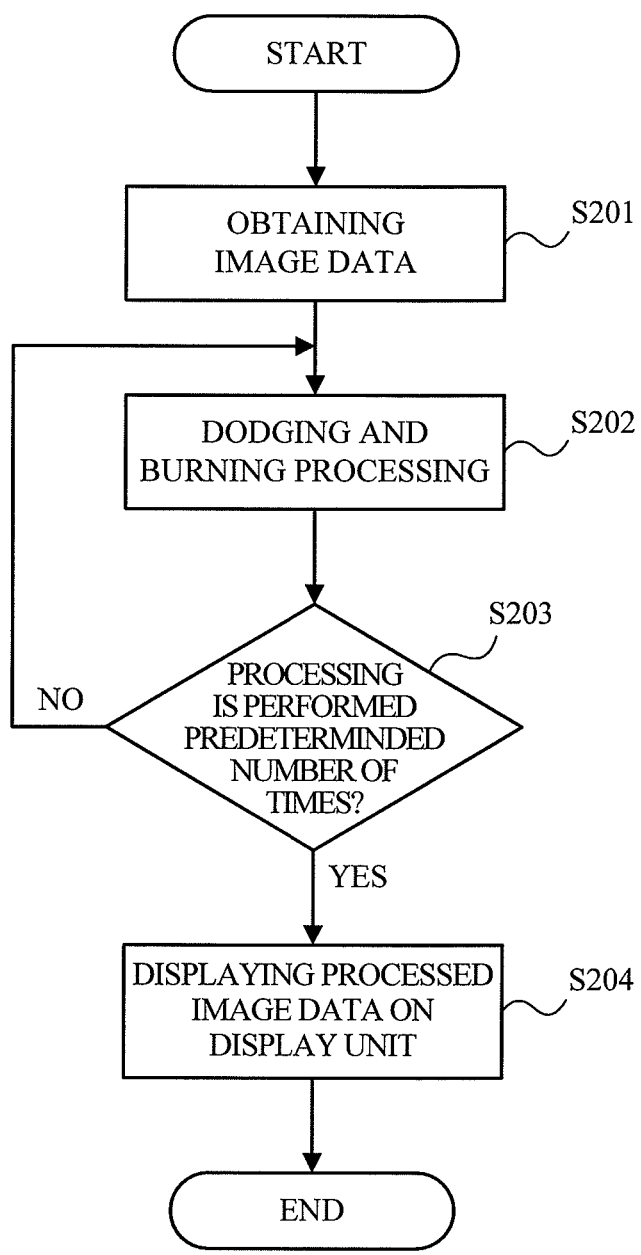
FIG. 2 is a flowchart illustrating an example of an image processing procedure in the first embodiment.

FIG. 2 is a flowchart illustrating an example of an image processing procedure in the embodiment.

In FIG. 2, when the object image is input to the lens 101, a processing is started. In step S201, the image data is obtained by the lens 101, image pickup element 102, and AFE 103. In the embodiment, the photographing of the still image is performed during the photographing of the moving image, the moving image data is input to the first image processing unit 104, and the still image data is input to the second image processing unit 105.

Subsequently, in step S202, the first dodging processing unit 106 of the first image processing unit 104 executes the dodging processing having a relatively-weak effect thereof and corrects the moving image data. After that, the first dodging processing unit 106 preliminarily calculates a ratio of the effects between the dodging processing having the relatively-weak effect thereof and the dodging processing having a relatively-strong effect thereof and determines how many times the dodging processing having the relatively-weak effect thereof is executed. The second dodging processing unit 107 of the second image processing unit 105 executes the dodging processing having the relatively-strong effect thereof and corrects the still image data.

Subsequently, in step S203, whether or not the number of times of execution of the dodging processing has reached the predetermined number of times is discriminated. As a result of the discrimination, if the processing is not performed the predetermined number of times, the processing routine is returned to step S202. The dodging processing having the relatively-weak effect thereof is then executed again to the moving image data. At this time, since the dodging processing having the relatively-strong effect thereof has already been executed to the still image data, the processing is not executed.

As a result of the discrimination in step S203, if the processing is executed the predetermined number of times, in step S204, the first display unit 108 displays the moving image corresponding to the moving image data subjected to the processing (first image data). The second display unit 109 displays the still image corresponding to the still image data subjected to the processing (second image data). If the first image processing unit 104 executes the dodging processing plural times and the processing time eventually becomes long, a frame rate of the moving image data may be reduced.

Second Embodiment

The second embodiment of the invention will be described hereinbelow with reference to FIGS. 3 to 5.

Figure 3:
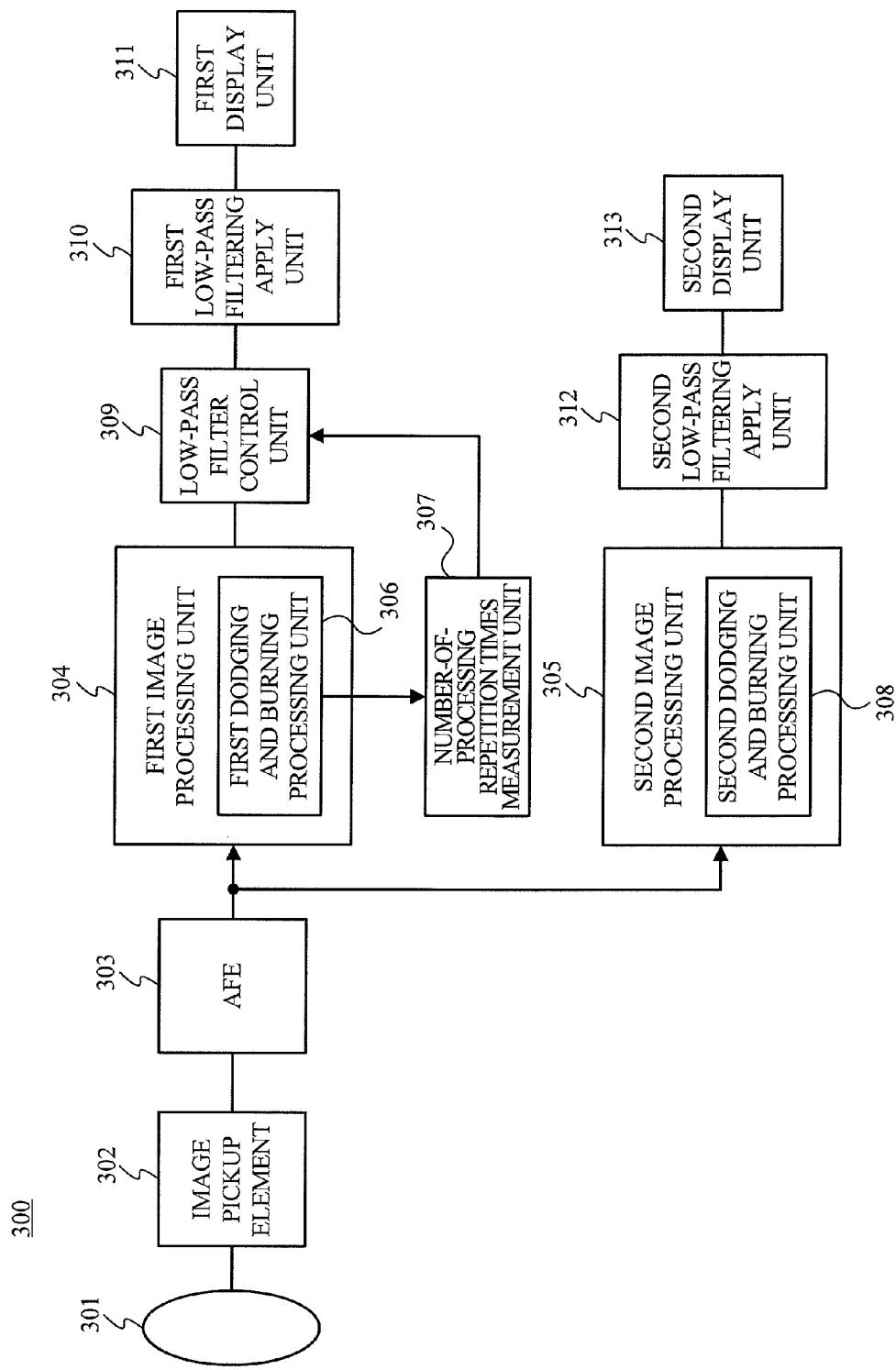
FIG. 3 is a block diagram illustrating an example of a construction of an image pickup apparatus according to the second embodiment.

FIG. 3 is a block diagram illustrating an example of a construction of an image pickup apparatus 300 according to the second embodiment. Since constructions from a lens 301 to a second image processing unit 305 are similar to those from the lens 301 to the second image processing unit 105 in FIG. 1, their description is omitted. Since processings of a first dodging processing unit 306 and a second dodging processing unit 308 are also similar to those of the first dodging processing unit 106 and the second dodging processing unit 107 in the first embodiment, their description is omitted. The second embodiment will be described with respect to an example in which a still image is photographed during the photographing of a moving image, moving image data is input to the first image processing unit 304, and still image data is input to the second image processing unit 305.

According to the digital dodging processing, since a gain is applied to the low luminance side, noises on the low luminance side become conspicuous. Due to its influence, a size of the image data to be compressed is larger than that of the image which is not subjected to the digital dodging processing. Therefore, in dependence on an image compression method, there are such problems that, for example, when the formed image data is distributed through a network, a load thereof increases, the frame rate decreases, and the like. To solve such problems, in the present embodiment, there are provided: a low-pass filter control unit 309 for deciding a cut-off frequency of a low-pass filtering processing after various kinds of image processings are performed in the first image processing unit 304; and a first low-pass filtering apply unit 310 for actually applying a low-pass filtering. Similarly, there is provided a second low-pass filtering apply unit 312 for applying a low-pass filtering after various kinds of image processings are performed in the second image processing unit 305.

A number-of-processing repetition times measurement unit 307 counts the number of times of the dodging processing having the relatively-weak effect thereof which is executed by the first dodging processing unit 306. The low-pass filter control unit 309 obtains information of the number of times of the executed dodging processing from the number-of-processing repetition times measurement unit 307 and decides the cut-off frequency.

The first low-pass filtering apply unit 310 applies a filtering for cutting high frequency components of the image data. Similarly, the second low-pass filtering apply unit 312 also applies a filtering for cutting high frequency components of the image data. The image data output from the first low-pass filtering apply unit 310 and the second low-pass filtering apply unit 312 are output respectively to a first display unit 311 and a second display unit 313 each of which is constructed by a CRT or a liquid crystal display. The first display unit 311 and the second display unit 313 may be constructed by one display unit in a manner similar to that in the first embodiment.

A processing procedure will be described hereinbelow with reference to FIG. 4.

Figure 4:
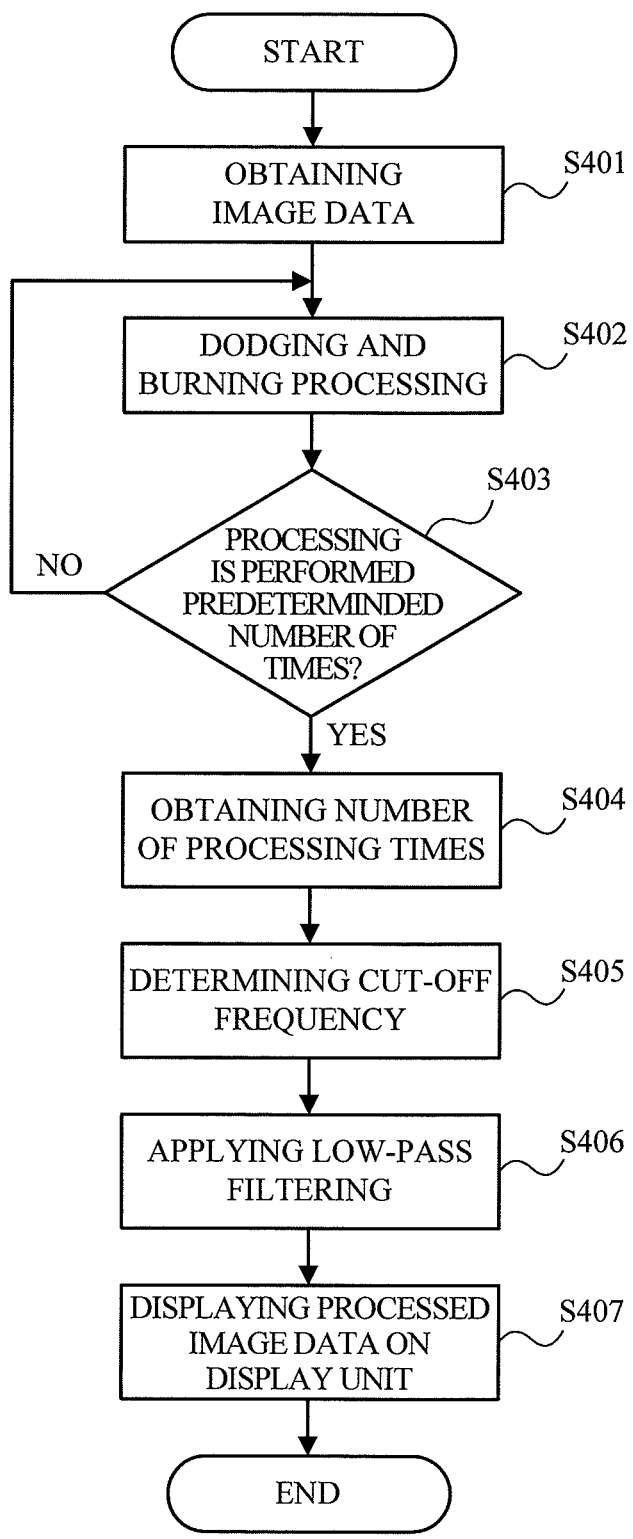
FIG. 4 is a flowchart illustrating an example of an image processing procedure in the second embodiment.

FIG. 4 is a flowchart illustrating an example of the image processing procedure in the second embodiment. Since processings in steps S401 to S403 are similar to those in steps S201 to S203 in FIG. 2, their description is omitted. The number-of-processing repetition times measurement unit 307 counts the number of times of the dodging processing which is executed while the processings in steps S402 to S403 are repeated.

In step S404, the low-pass filter control unit 309 obtains the information of the number of times of the executed dodging processing which is measured by the number-of-processing repetition times measurement unit 307. In step S405, the low-pass filter control unit 309 decides the cut-off frequency in accordance with the number of times of the executed dodging processing.

Figure 5:
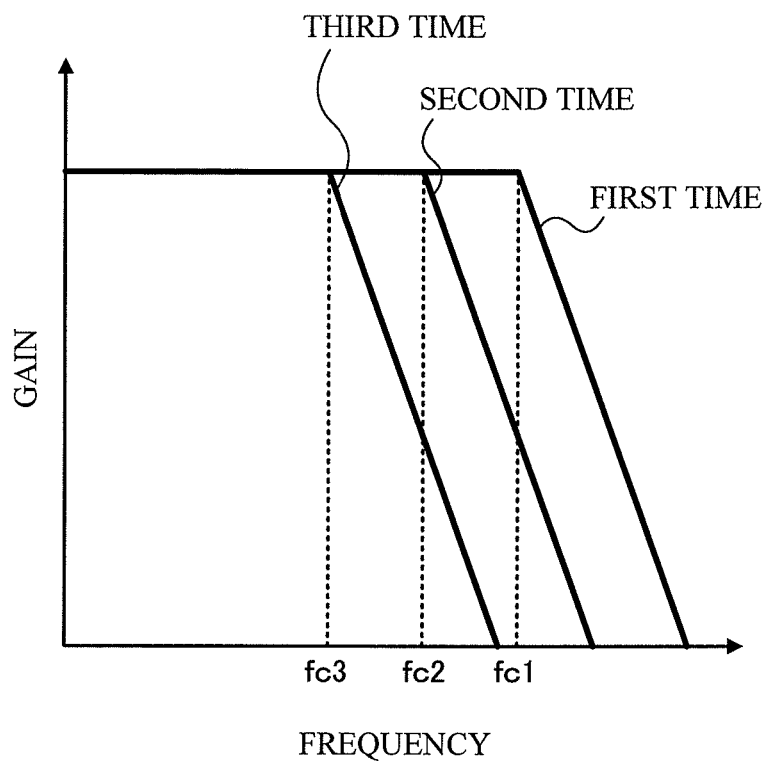
FIG. 5 is a diagram illustrating a relationship between a cut-off frequency and a gain for each number of times the dodging processing is performed.

FIG. 5 is a diagram illustrating a relationship between the cut-off frequency and the gain of the low-pass filter for each number of times the dodging processing is performed.

As illustrated in FIG. 5, the larger the number of times of execution of the dodging processing becomes, the more the noise components become conspicuous. Therefore, the cut-off frequency is shifted to the low-frequency side. In other words, the larger the number of times of execution of the dodging processing is, the low-pass filtering having a stronger noise reduction effect is applied. By using such a technique, the image size can be decreased and the noises can be reduced.

Subsequently, in step S406, the first low-pass filtering apply unit 310 applies the low-pass filtering to the moving image data by the cut-off frequency decided in step S405. The second low-pass filtering apply unit 312 applies the low-pass filtering to the still image data by the cut-off frequency which has previously been input. In step S407, the first display unit 311 displays the moving image corresponding to the moving image data. The second display unit 313 displays the still image corresponding to the still image data subjected to the processing.

Third Embodiment

The third embodiment of the invention will be described hereinbelow with reference to FIGS. 6 and 7.

Figure 6:
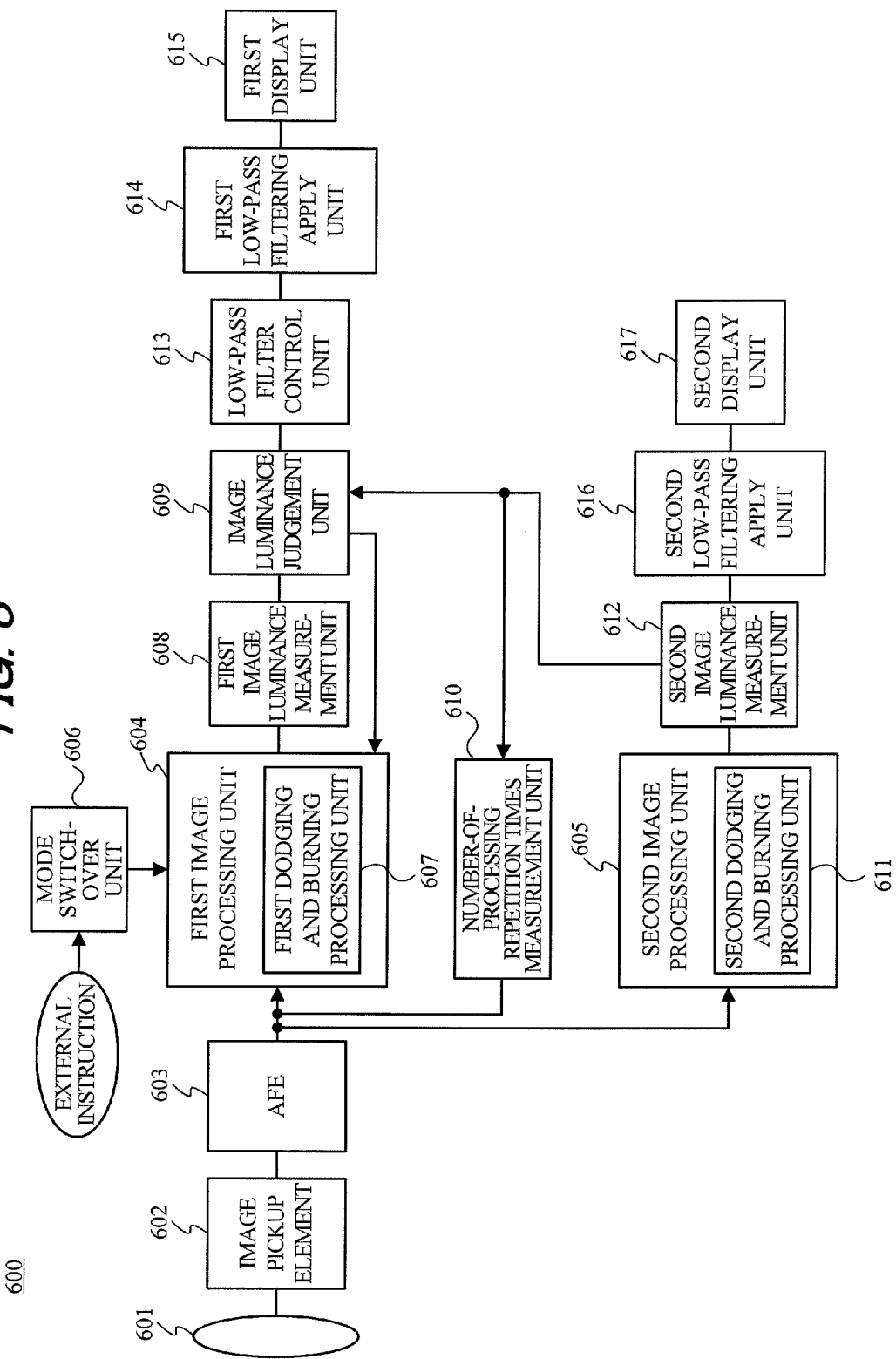
FIG. 6 is a block diagram illustrating an example of a construction of an image pickup apparatus according to the third embodiment.

FIG. 6 is a block diagram illustrating an example of a construction of an image pickup apparatus 600 according to the third embodiment. Since constructions from a lens 601 to an AFE 603 are similar to those from the lens 101 to the AFE 103 in FIG. 1, their description is omitted. Since processings of a first dodging processing unit 607 and a second dodging processing unit 611 are also similar to those of the first dodging processing unit 106 and the second dodging processing unit 107 in the first embodiment, their description is omitted. The third embodiment will be described with respect to an example in which a still image is photographed during the photographing of a moving image, moving image data is input to a first image processing unit 604, and still image data is input to a second image processing unit 605.

A mode switch-over unit 606 switches the mode by an instruction of the user. A first image luminance measurement unit 608 measures a luminance (first luminance value) of a picture in the image data (moving image data) subjected to the dodging processing by the first dodging processing unit 607. On the other hand, a second image luminance measurement unit 612 measures a luminance (second luminance value) in the image data (still image data) subjected to the dodging processing by the second dodging processing unit 611.

An image luminance judgement unit 609 compares the first luminance measurement value and the second luminance measurement value mentioned above. If the first luminance measurement value<the second luminance measurement value, the image luminance judgement unit 609 instructs the first image processing unit 604 to repeat the dodging processing. A number-of-processing repetition times measurement unit 610 counts the number of dodging processing executed with respect to the image data of one picture by the first dodging processing unit 607.

As already described in the second embodiment, after the digital dodging processing is executed, if the image data is distributed, the frame rate decreases. Therefore, in the present embodiment, the low-pass filtering is applied in a manner similar to that in the second embodiment. Since constructions of a low-pass filter control unit 613 to a second display unit 617 are similar to those of the low-pass filter control unit 309 to the second display unit 313 in FIG. 3, their description is omitted here.

A processing procedure will be described hereinbelow with reference to FIG. 7.

Figure 7:
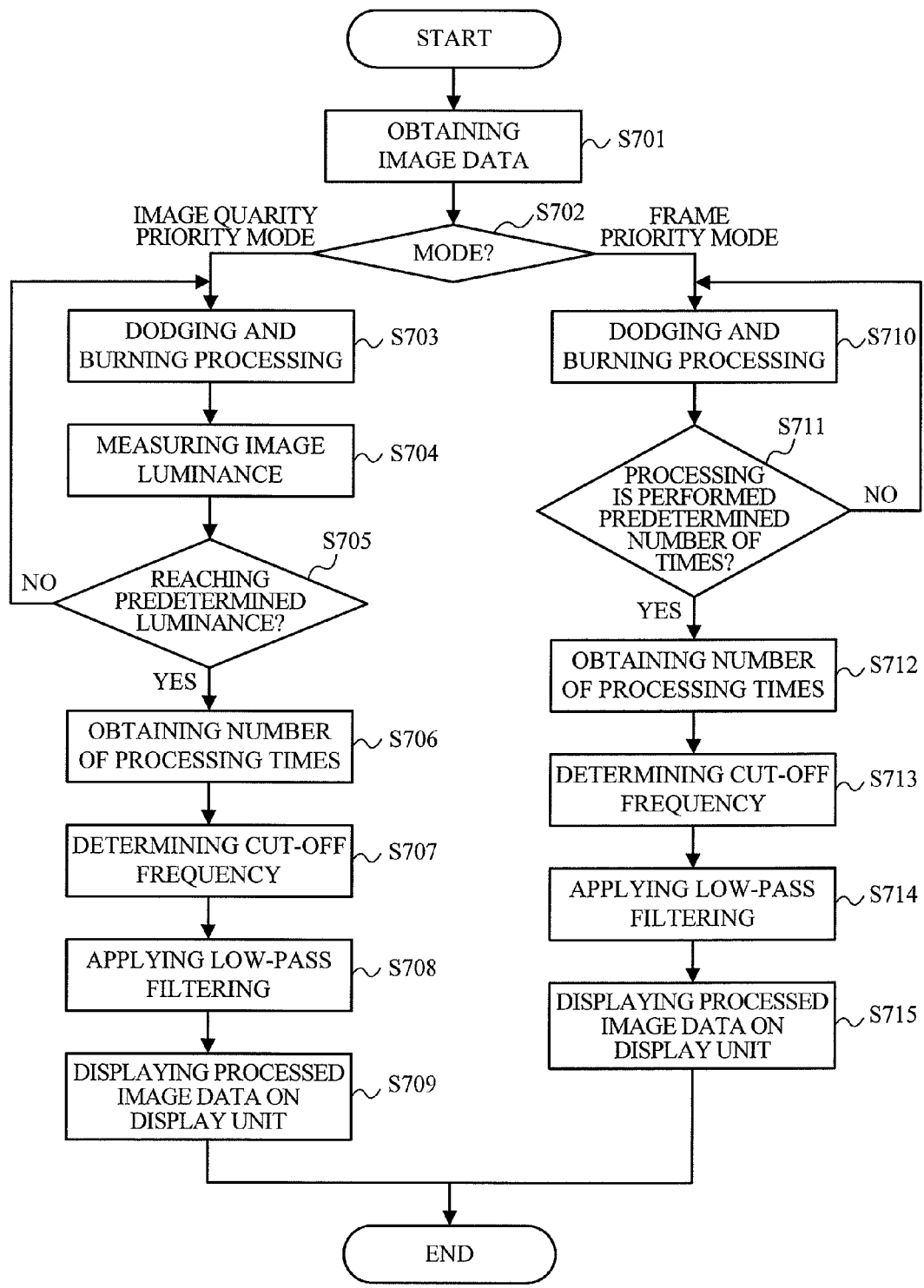
FIG. 7 is a flowchart illustrating an example of an image processing procedure in the third embodiment.

FIG. 7 is a flowchart illustrating an example of the image processing procedure in the third embodiment. The processing operation in FIG. 7 will be described with respect to two modes of a frame priority mode and an image quality priority mode. Although the embodiment will be described with respect to two modes of the image quality priority mode as a first mode and the frame priority mode as a second mode, the invention is not limited to those two modes but can be also applied to a case having a plurality of modes such as a resolution priority mode and the like within a scope without departing from the spirit of the invention.

In step S701, image data is obtained by a procedure similar to that in step S201 in FIG. 2. Subsequently, in step S702, the mode switch-over unit 606 judges which one of the frame priority mode and the image quality priority mode has previously been selected by the user. As a result of the judgement, if the image quality priority mode has been selected, in step S703, the first image processing unit 604 and the first dodging processing unit 607 execute the dodging processing by a procedure similar to that in step S202 in FIG. 2 and correct the moving image data and the still image data.

Subsequently, in step S704, the first image luminance measurement unit 608 measures the luminance value (first luminance value) of the moving image data subjected to the dodging processing. When the luminance value is measured, particularly, importance is attached to the low luminance image data in a bright image. The second image luminance measurement unit 612 measures a luminance value (second luminance value) of the still image data subjected to the dodging processing.

Subsequently, in step S705, the image luminance judgement unit 609 compares the first luminance value measured by the first image luminance measurement unit 608 with the second luminance value measured by the second image luminance measurement unit 612. As a result of the comparison, if the first luminance value<the second luminance value, the processing routine is returned to step S703 and the dodging processing having the relatively-weak effect thereof is executed to the moving image data. At this time, since the dodging processing having the relatively-strong effect thereof has already been executed to the still image data, the processing is not executed. While the processings of steps S703 to S705 are repeated, the number-of-processing repetition times measurement unit 610 counts the number of times of the execution of the dodging processing.

As a result of the judgement of step S705, if the first luminance value the second luminance value, the processing routine advances to step S706. Processings of steps S706 to S709 are similar to those of steps S404 to S407 in FIG. 4.

As a result of the judgement of step S702, if the frame priority mode is selected, in step S710, the first image processing unit 604 decides the limited number of times of the execution of the dodging processing on the basis of the image size and the dodging processing time so that the frame rate reaches about 30 fps. The first image processing unit 604 and the first dodging processing unit 607 execute the dodging processing by a procedure similar to that in step S202 in FIG. 2 and correct the moving image data and the still image data.

Subsequently, in step S711, the first image processing unit 604 judges whether or not the dodging processing has been executed up to the limited number of times decided in step S710. As a result of the judgement of step S711, if the dodging processing is not executed up to the limited number of times, the processing routine is returned to step S710 and the dodging processing having the relatively-weak effect thereof is executed to the moving image data. At this time, since the dodging processing having the relatively-strong effect thereof has already been executed to the still image data, the processing is not executed. While the processings of steps S710 to S711 are repeated, the number-of-processing repetition times measurement unit 610 counts the number of times of the execution of the dodging processing.

As a result of the judgement of step S711, if the dodging processing has been executed up to the limited number of times, the processing routine advances to step S712. Processings of steps S712 to S715 are similar to those of steps S404 to S407 in FIG. 4.

Fourth Embodiment

The fourth embodiment of the invention will be described hereinbelow with reference to FIGS. 8 and 9.

Figure 8:
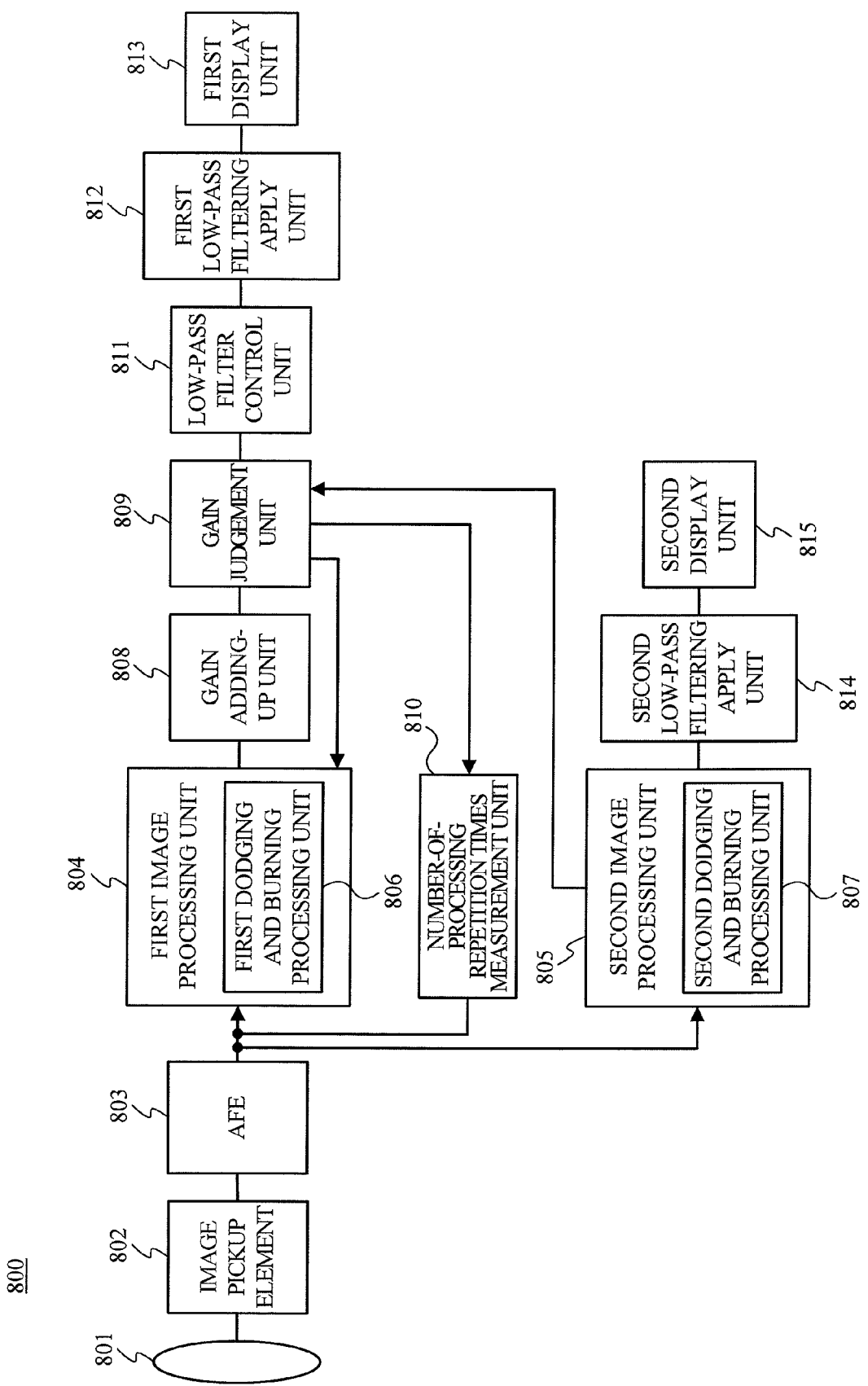
FIG. 8 is a block diagram illustrating an example of a construction of an image pickup apparatus according to the fourth embodiment.

FIG. 8 is a block diagram illustrating an example of a construction of an image pickup apparatus 800 according to the fourth embodiment. Since constructions from a lens 801 to a second dodging processing unit 807 are similar to those from the lens 101 to the second dodging processing unit 107 in FIG. 1, their description is omitted. Since constructions from a low-pass filter control unit 811 to a second display unit 815 are also similar to those from the low-pass filter control unit 613 to the second display unit 617 in FIG. 6, their description is omitted. The fourth embodiment will be described with respect to an example in which a still image is photographed during the photographing of a moving image, moving image data is input to the first image processing unit 804, and still image data is input to the second image processing unit 805.

In the embodiment, a gain adding-up unit 808 calculates the total of the gains applied to the moving image data in the first dodging processing unit 806. A gain judgement unit 809 compares the total of the gains calculated by the gain adding-up unit 808 with a preset gain. If the total of the gains measured<the preset gain, the gain judgement unit 809 instructs the first image processing unit 804 so as to repeat the dodging processing. A number-of-processing repetition times measurement unit 810 measures the number of dodging processing executed with respect to the image data of one picture by the first dodging processing unit 806.

A processing procedure will be described hereinbelow with reference to FIG. 9.

Figure 9:
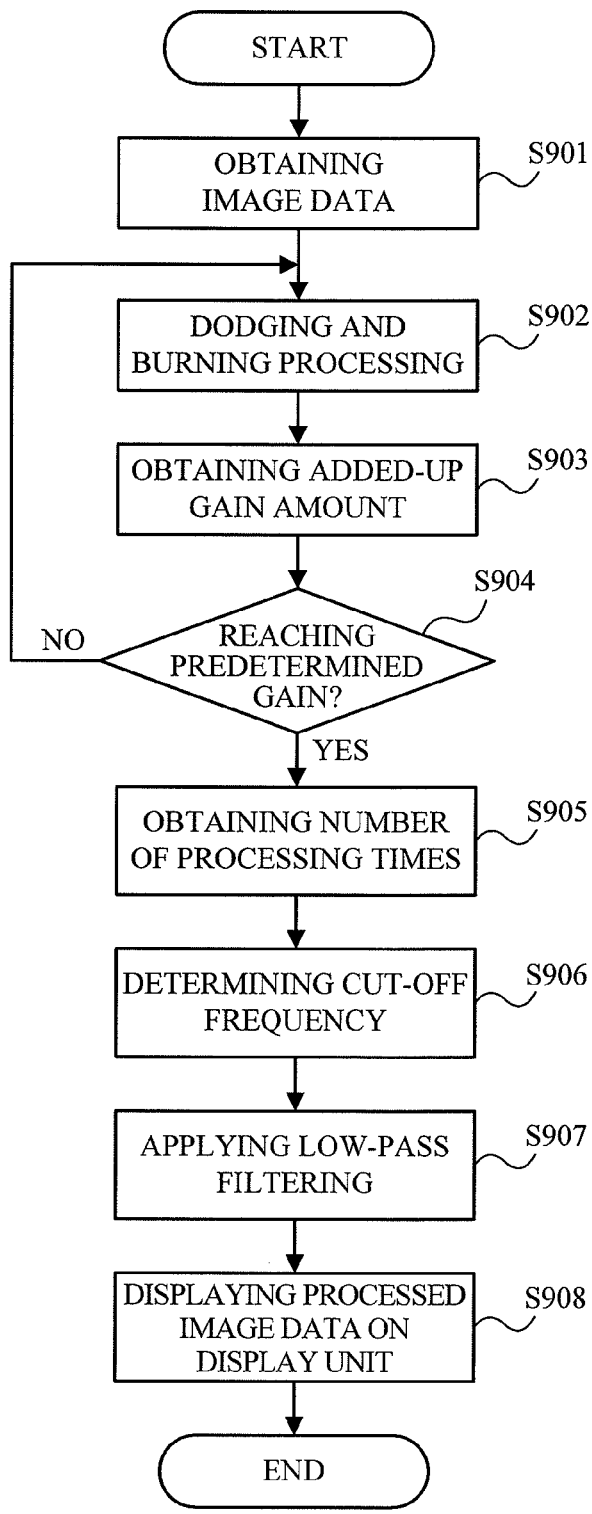
FIG. 9 is a flowchart illustrating an example of an image processing procedure in the fourth embodiment.

FIG. 9 is a flowchart illustrating an example of the image processing procedure in the fourth embodiment.

In step S901, image data is obtained by a procedure similar to that in step S201 in FIG. 2. Subsequently, in step S902, the first dodging processing unit 806 of the first image processing unit 804 executes the dodging processing having the relatively-weak effect thereof and corrects the moving image data. On the other hand, the second dodging processing unit 807 of the second image processing unit 805 executes the dodging processing having the relatively-strong effect thereof and corrects the still image data. After that, the gain of the dodging processing in the dodging processing having the relatively-strong effect thereof is calculated and the calculated value is set as a predetermined gain. However, it is noted that an arbitrary gain may be set.

Subsequently, in step S903, the gain adding-up unit 808 measures an amount of the gains applied to the image and obtains information of the gain amount. In step S904, the gain judgement unit 809 judges whether or not the measured total of the gains reaches the predetermined gain or more. As a result of the judgement, if the measured total of the gains does not reach the predetermined gain, the processing routine is returned to step S902 and the dodging processing having the relatively-weak effect thereof is executed again to the moving image data. At this time, since the dodging processing having the relatively-strong effect thereof has already been executed to the still image data, the processing is not executed. While the processings in steps S902 to S904 are repeated, the number-of-processing repetition times measurement unit 810 counts the number of times of the execution of the dodging processing.

On the other hand, as a result of the judgement in step S904, if the measured total of the gains reaches the predetermined gain, the processing routine advances to step S905. Processings of steps S905 to S908 are similar to those of steps S404 to S407 in FIG. 4.

As mentioned above, according to the first to fourth embodiments, the dodging processing having the relatively-strong effect thereof is executed once to the still image data and the dodging processing having the relatively-weak effect thereof is repeated a plurality of times to the moving image data. Thus, the difference between the effect of the dodging processing executed to the moving image and that executed to the still image can be reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-242373, filed on Oct. 28, 2010 which is hereby incorporated by reference herein in its entirety.

What is claimed is:

1. An image processing apparatus comprising:
   an obtaining unit configured to obtain an image signal obtained by picking up an image of an object;
   a first image processing unit configured to generate first image data by executing a dodging processing to the image signal obtained by the obtaining unit, wherein the first image processing unit repeats the dodging processing a plurality of times;
   a second image processing unit configured to generate second image data by executing a dodging processing having a stronger effect thereof than the single dodging processing by the first image processing unit to the image signal obtained by the obtaining unit; and
   a low-pass filtering apply unit configured to perform a low-pass filtering processing in accordance with a number of repetition times of the dodging processing by the first image processing unit.

2. An apparatus according to claim 1, wherein the first image data is moving image data and the second image data is still image data.

3. An apparatus according to claim 2, further comprising a control unit configured to decrease a frame rate of the first image data when the dodging processing is performed a plurality of times by the first image processing unit.

4. An apparatus according to claim 2, further comprising a switch-over unit configured to switch an image quality priority first mode and a frame rate priority second mode,
   and wherein when the mode is switched to the first mode by the switch-over unit, the first image processing unit performs the dodging processing and thereafter measures luminance, thereby deciding the number of repetition times.

5. An apparatus according to claim 2, further comprising a switch-over unit configured to switch an image quality priority first mode and a frame rate priority second mode,
   and wherein when the mode is switched to the second mode by the switch-over unit, the first image processing unit limits the number of repetition times of the dodging processing.

6. An apparatus according to claim 2, wherein the first image processing unit decides the number of repetition times by measuring a total of gains applied by the dodging processing.

7. An apparatus according to claim 1, wherein each of the first image processing unit and the second image processing unit is constructed by a different IC device.

8. An apparatus according to claim 1, wherein the dodging processing includes applying a gain to a first image data of a first luminance, higher than a gain to a second image data of a second luminance which is higher than the first luminance.

9. An apparatus according to claim 1, wherein the dodging processing includes applying a gain to the image data of low luminance.

10. An image processing method comprising:
    an obtaining step of obtaining an image signal obtained by picking up an image of an object;
    a first image processing step of generating first image data by executing a dodging processing to the image signal obtained in the obtaining step, wherein in the first image processing step, the dodging processing is repeated a plurality of times;
    a second image processing step of generating second image data of an image compression method different from that of the first image data by executing a dodging processing having a stronger effect thereof than that of the single dodging processing in the first image processing step to the image signal obtained in the obtaining step; and
    a low-pass filtering apply step of performing a low-pass filtering processing in accordance with a number of repetition times of the dodging processing in the first image processing step.

11. A non-transitory computer-readable storage medium storing a computer program comprising a program code for causing a computer to execute an image processing method set forth in claim 10.

12. An image processing apparatus comprising:
    an obtaining unit configured to obtain an image signal obtained by picking up an image of an object;
    a first image processing unit configured to generate first image data by executing a dodging processing to the image signal obtained by the obtaining unit, wherein the first image processing unit repeats the dodging processing a plurality of times; and
    a second image processing unit configured to generate second image data by executing a dodging processing having a stronger effect thereof than the single dodging processing by the first image processing unit to the image signal obtained by the obtaining unit, and
    wherein the first image data is moving image data and the second image data is still image data.

13. An image processing apparatus comprising:
    an obtaining unit configured to obtain an image signal obtained by picking up an image of an object;
    a first image processing unit configured to generate first image data by executing a dodging processing to the image signal obtained by the obtaining unit, wherein the first image processing unit repeats the dodging processing a plurality of times;
    a second image processing unit configured to generate second image data by executing a dodging processing having a stronger effect thereof than the single dodging processing by the first image processing unit; and
    a control unit configured to decrease a frame rate of the first image data when the dodging processing is performed a plurality of times by the first image processing unit.

14. An image processing apparatus comprising:
    an obtaining unit configured to obtain an image signal obtained by picking up an image of an object;
    a first image processing unit configured to process first image data by applying a gain to the image signal of low luminance, wherein the first image processing unit repeats the processing a plurality of times;
    a second image processing unit configured to process second image data by applying a gain to the image signal of low luminance, having a stronger effect thereof than the single processing by the first image processing unit; and
    a low-pass filtering apply unit configured to perform a low-pass filtering processing in accordance with a number of repetition times of the processing by the first image processing unit.

* * * * *